(12) United States Patent
Das et al.

(10) Patent No.: US 7,986,627 B2
(45) Date of Patent: Jul. 26, 2011

(54) METHOD FOR TRANSMITTING CONTROL INFORMATION ON THE FORWARD LINK OF A WIRELESS NETWORK

(75) Inventors: Suman Das, Colonia, NJ (US); Shirish Nagaraj, Cedar Knolls, NJ (US); Subramanian Vasudevan, Morristown, NJ (US); Harish Viswanathan, Morristown, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1345 days.

(21) Appl. No.: 11/332,023

(22) Filed: Jan. 13, 2006

(65) Prior Publication Data
US 2007/0165857 A1    Jul. 19, 2007

(51) Int. Cl.
*H04J 11/00* (2006.01)
(52) U.S. Cl. .............. 370/235; 370/208; 370/209
(58) Field of Classification Search .............. 380/237
See application file for complete search history.

(56) References Cited

U.S. PATENT DOCUMENTS

| | | | | |
|---|---|---|---|---|
| 6,240,071 | B1 * | 5/2001 | Willenegger et al. | 370/311 |
| 6,389,034 | B1 * | 5/2002 | Guo et al. | 370/441 |
| 6,996,159 | B2 * | 2/2006 | Moshavi et al. | 375/148 |
| 6,999,467 | B2 * | 2/2006 | Krauss et al. | 370/441 |
| 7,123,580 | B2 * | 10/2006 | Tang et al. | 370/210 |
| 7,133,460 | B2 * | 11/2006 | Bae et al. | 375/295 |
| 7,298,777 | B2 * | 11/2007 | McDonough et al. | 375/148 |
| 7,492,788 | B2 * | 2/2009 | Zhang et al. | 370/468 |
| 2003/0202492 | A1 * | 10/2003 | Akella et al. | 370/335 |
| 2004/0190640 | A1 * | 9/2004 | Dubuc et al. | 375/260 |
| 2005/0058104 | A1 * | 3/2005 | Yomo et al. | 370/335 |
| 2005/0283687 | A1 | 12/2005 | Sutivong et al. | 714/712 |
| 2005/0288027 | A1 * | 12/2005 | Cho et al. | 455/442 |
| 2006/0050664 | A1 | 3/2006 | Guey | |

FOREIGN PATENT DOCUMENTS

EP  1 180 866 A1  2/2002
WO  PCT/US2007/00640  6/2007

OTHER PUBLICATIONS

Jim Tomcik et al, "OFDD Technology Overview Presentation", Internet Citation, [Online], Oct. 28, 2005, XP002429296, retrieved from the internet: URL:http://grouper.ieee.org/groups/802/20/Contribs/C802.20-05-59.pdf, p. 35-37, 41.

* cited by examiner

*Primary Examiner* — Minh Dinh
*Assistant Examiner* — David Le
(74) *Attorney, Agent, or Firm* — Martin I. Finston

(57) ABSTRACT

A signaling method is provided that can improve the efficiency of forward-link control signaling in OFDM systems. The method involves using a set of forward-link subcarriers that are dedicated for control information, and are shared by a set of two or more users. The control information destined for each user is spread using a respective spreading code, thereby to provide a spread control message. The spread control messages destined for the various users are summed together prior to transmission.

10 Claims, 2 Drawing Sheets

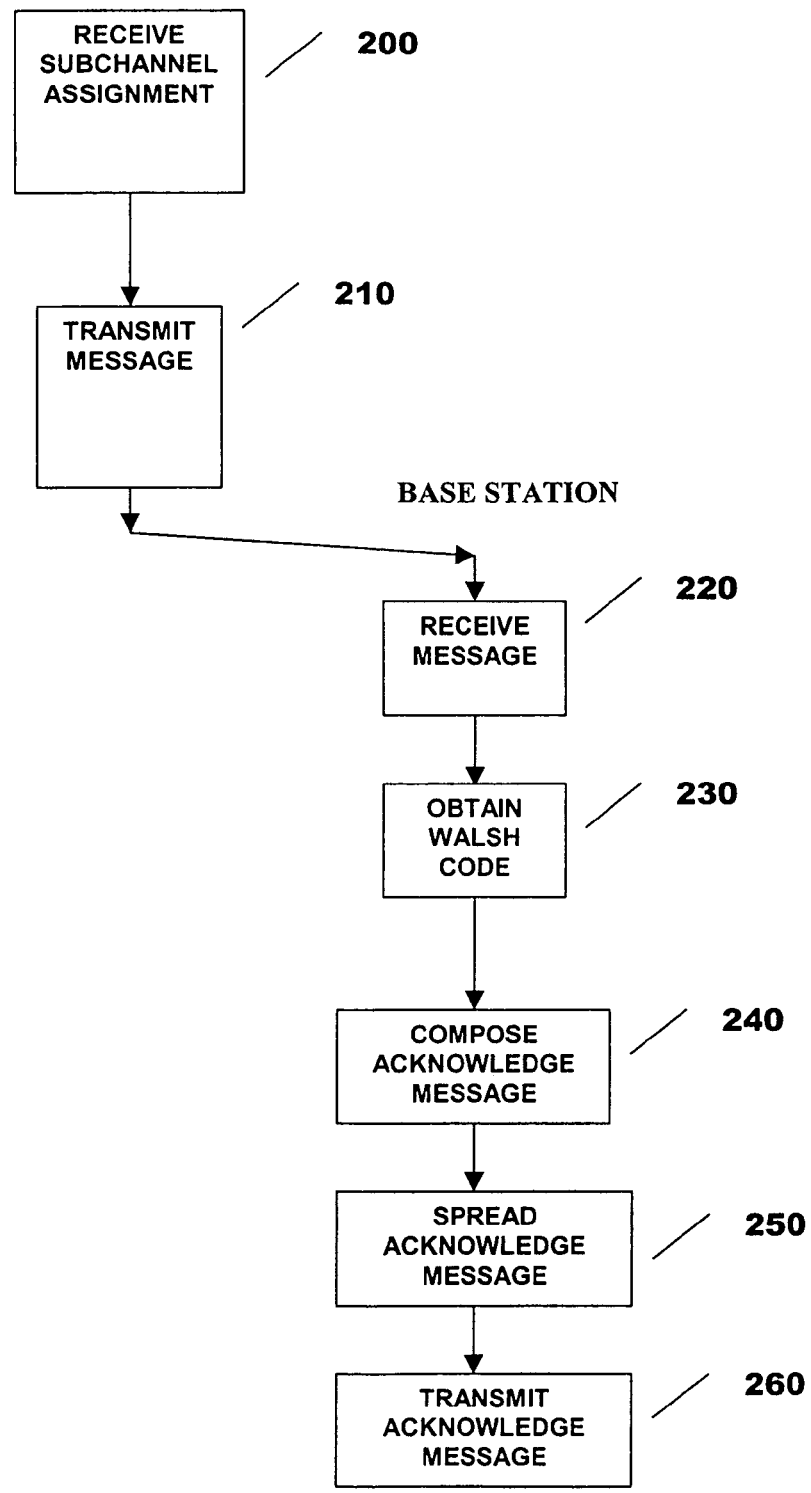

METHOD FOR TRANSMITTING CONTROL INFORMATION ON THE FORWARD LINK OF A WIRELESS NETWORK

FIELD OF THE INVENTION

This invention relates to wireless communication, and more particularly to control signals in an OFDM network.

ART BACKGROUND

It is essential for the operation of a practical wireless communication network to support the communication of control information between a base station and the user terminals that it supports. By "control information" is meant any information related to the operation of the network and its components, as distinct from content, i.e., from the information which is to be communicated between users.

Control information to be communicated on the forward link, i.e. from the base station to the user terminal, may include, for example, acknowledgement bits and power-control bits. An acknowledgement bit indicates to the user terminal whether a message sent in a particular time window on the reverse link, i.e., from the user terminal to the base station, was successfully decoded at the base station. As is well known, acknowledgement bits may be positive, i.e., indicative of successful decoding, or negative, i.e., indicative of an unsuccessful decoding attempt. A power-control bit indicates to the user terminal that transmission power on the reverse link should be adjusted up or down. Those skilled in the art will appreciate that numerous other types of control information may also be communicated on the forward link.

It is well known that no communication channel has unlimited capacity. Instead, the consumption of bandwidth and power resources by control signaling will often limit the extent to which those resources are available for transmitting content. As a consequence, there is an economic incentive to minimize signaling overhead, i.e., the extent to which control signaling takes up bandwidth and power resources.

For example, OFDMA systems such as those that conform to the standard IEEE 802.16e assign frequency resources for transmitting control information on the forward link. Each signaling bit may be sent on a particular subcarrier or set of subcarriers reserved for a particular user. Alternatively, signaling bits may be pooled and sent on a common set of reserved subcarriers. In this second scenario, the signaling bit or bits for a particular user are appended to an identification word for that user, so that at the receiving end, each user can identify its own destined control information.

When each user has one or more dedicated subcarriers, there will typically be sufficient dedicated bandwidth to process that user's control messages at the peak rate. However, control information is not necessarily transmitted to a given user at a constant rate. Instead, it may be sent sporadically. For example, in some systems acknowledgment bits will be sent only in response to successful decoding attempts, as explained above. As a consequence, signaling bandwidth is used inefficiently.

On the other hand, the use of pooled bandwidth according to the second of the scenarios described above is inefficient because it requires user identification bits to be sent together with the control information. Since there are typically many more users than there may be control bits per user, the user identification bits may constitute a substantial amount of overhead.

For the systems described above, and others, there remains a need for improving the efficiency of forward-link control signaling.

SUMMARY OF THE INVENTION

We have found a new signaling method that can improve the efficiency of forward-link control signaling in OFDM systems, that is, in systems that can transmit information in multiple mutually orthogonal frequency subcarriers that are organized into selectable subchannels.

In a broad aspect, our method involves using a set of forward-link subcarriers that are dedicated for control information, and are shared by a set of two or more users. The control information destined for each user is spread using a respective spreading code, thereby to provide a spread control message. The spread control messages destined for the various users are summed together prior to transmission.

In another broad aspect, our method involves, at a user terminal, receiving a transmission from the forward link on a set of subcarriers that are dedicated for control information, and despreading the received transmission to recover a control message destined for that user terminal.

BRIEF DESCRIPTION OF THE DRAWING

FIG. 3 is a flowchart illustrating the association of Walsh codes with assigned subchannels in accordance with the present invention in certain embodiments.

DETAILED DESCRIPTION

Figure 1:
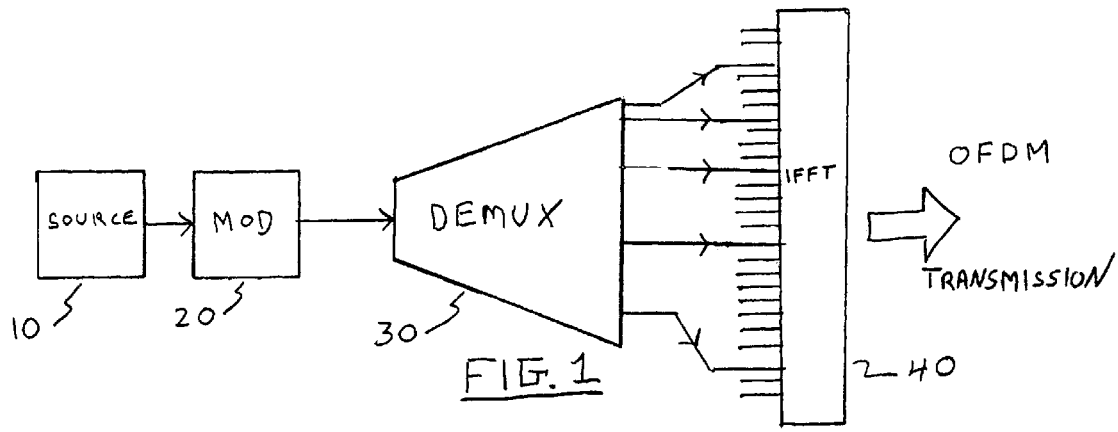
FIG. 1 is a simplified schematic representation of a typical OFDM transmitter of the prior art.

A typical OFDM transmitter of the prior art is shown schematically, in simplified form, in FIG. 1. As will be seen in the figure, a sequence of coded bits representing a word from information source 10 is mapped at modulator 20 to a sequence of one or more symbols from a symbol constellation, such as QPSK symbols. By a "word" from information source 10 is meant any message or portion thereof. At demultiplexer 30, the resulting symbol sequence is directed to a plurality of ports corresponding to the respective subcarriers that constitute a desired subchannel, and at processor 40, the symbol sequence is conditioned for subsequent transmission by subjecting it to an inverse fast Fourier transform (IFFT) or other appropriate processing. Signal processing in the transmitter subsequent to the IFFT is well known in the art and need not be described here in detail.

Figure 2:
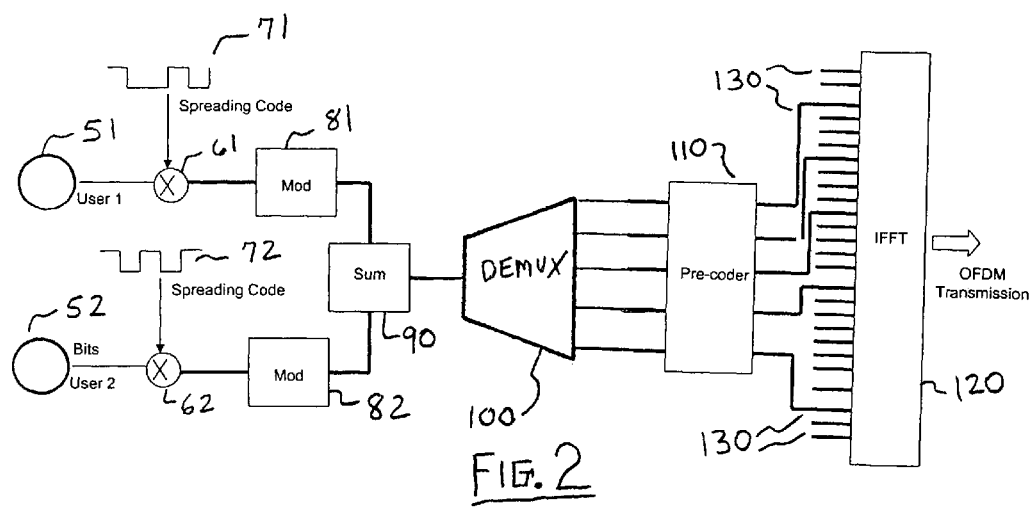
FIG. 2 shows in simplified, schematic view of a method in accordance with the present invention in an illustrative embodiment.

FIG. 2 shows in simplified, schematic view an illustrative embodiment of our new method. For purposes of illustration, only two users are indicated in the figure. The users are designated by reference numerals 51 and 52, respectively. As seen in the figure, the bit stream from user 51 is spread at multiplier 61 with a spreading code 71, and the bit stream from user 52 is spread at multiplier 62 with a different spreading code, designated by reference numeral 72. The respective spreading codes are advantageously selected to be mutually orthogonal, but as explained below, orthogonality is not a requirement.

The spread signals are respectively modulated at modulators 81, 82 by mapping the input bits to symbols from a constellation, such as QPSK symbols. It should be noted in this regard that each input bit will correspond to one chip of the pertinent spreading code, and will typically represent the real or imaginary part of a signal value in the symbol stream from the pertinent user.

It should be noted in this regard that in alternate embodiments, the data provided by the users may be mapped to QPSK symbols or the like prior, rather than subsequent, to spreading at multipliers 61, 62.

The symbol streams are all added together at summing element 90. The resulting data stream is demultiplexed at demultiplexer 100 into a block of N output symbols, in which N is an integer related to the spreading factor, i.e., to the length of the spreading codes. In some cases, N may be equal to the spreading factor. However, this is not necessarily the case. For example, N may be more or less than the spreading factor, e.g., a multiple or sub-multiple thereof, as is well known in the art.

Optionally, pre-coder 110 linearly maps some or all of the N output symbols from the demultiplexer to a like number of new output symbols in a fixed manner which is known to the user terminals. Such a mapping may be useful, for example, for compensating the signal for known properties of the propagation channel prior to transmission.

The N output symbols are then mapped to subcarriers which span one or more OFDM symbols. This mapping is represented in FIG. 2 by the choice of input ports 130 to processor 120 to which the various output symbols from pre-coder 110 have been directed. The subcarriers that have been set aside for control signaling as described above are referred to here as "control subcarriers".

The remaining subcarriers, i.e., those that have not been set aside as control subcarriers, may be used, e.g., for conventional OFDM or OFDMA transmission of content and control messages.

At processor 120, an IFFT or other appropriate transformation is applied to the symbols presented to the input ports 130, thereby to condition the input information for subsequent transmission. The subsequent processing is conventional and need not be described here in detail.

At the receiving end, a receiver associated with the individual user terminal (not shown) demodulates the received waveform, e.g. by conventional OFDM demodulation, to recover the symbols carried on the control subcarriers. The symbols are then despread using the user's equivalent spreading code, and decoded for message recovery. By "equivalent" is meant that the user's code is effective for recovering signals that were spread by a code at the transmitting end associated with that user. The respective user-associated codes at the transmitting and receiving ends are not necessarily the same, because, e.g., the equivalent code at the receiving end may take into account the action of pre-coder 110.

For increasing time diversity, the subcarriers to which the precoder output is mapped may span multiple OFDM symbols.

Various options may be used in selecting the spreading codes that distinguish the control signals for one user from those for another user. In any case, however, each user must be provided with information sufficient to despread its control signals from the received waveform. This information may be the spreading code itself, or as noted, it may be a suitably modified "equivalent" spreading code.

One option is to use the pseudo-noise (PN) sequences assigned to the respective users at call set-up. The PN sequences assigned to a given pair of users may not be mutually orthogonal. In fact, they may be different only in their respective timing offsets. However, they may still provide sufficient mutual decorrelation for each user to be able to recover its own destined control signals. This will be especially successful in environments that suffer from relatively little interference. The use of PN sequences is efficient because no extra signaling is required to assign the spreading codes, and because the spreading factor can be relatively small and thus relatively conservative in the use of bandwidth.

Another option is to assign respective, mutually orthogonal Walsh codes to the users. Code orthogonality will generally lead to lower interference between control signals destined for different user terminals. However, the greater the number of users, the greater must be the length of the Walsh codes in order to assure orthogonality between every pair of users. Using such long Walsh codes is inefficient, because in principle they can support signaling to all users simultaneously, whereas in practice control signals tend to be sent to only some users at any given time. Thus, this option leads to some waste of bandwidth.

Yet another option takes advantage of those instances in which the network assigns a traffic or data subchannel to a user in a given timeslot. For example, the network may assign the user terminal a subchannel for carrying user data on the reverse link. In such instances, the specific traffic or data subchannels that may be assigned will be known in advance, and the number of such subchannels will be less than the total number of users. A respective Walsh code can be assigned, in advance, to each of these subchannels. After each assignment of a subchannel to a user, the base station can use the corresponding Walsh code as the spreading code for sending control information on the forward link to that user. This will be especially convenient when, e.g., the forward-link control information includes an acknowledgement of the data that was just previously transmitted on the reverse link.

Assignment of Walsh codes in the manner described above, i.e., based on subchannel assignments, is relatively efficient because it is feasible with fewer codes than there are users. Moreover, because there are relatively few codes, mutual orthogonality can be achieved with codes of shorter length than would be the case if each user had a distinct code.

With reference to FIG. 3, for example, the user receives an assignment of a control subchannel (block 200). The user transmits a control message containing, e.g., a report or request to the base station on the assigned subchannel (block 210). The base station receives the control message (block 220). The base station obtains the Walsh code that corresponds to the assigned subchannel from, e.g., a look-up table (block 230). The base station composes an acknowledgement message (block 240), spreads the acknowledgement message with the Walsh code that was obtained (block 250), and transmits the acknowledgement message (block 260).

Yet a further option is to form spreading codes that combine Walsh codes with PN sequences. For example, the users may be partitioned into non-overlapping groups, and the same limited set of Walsh codes reused for each such group. Then, a different PN sequence may be assigned to each user group. For each group, the Walsh codes would be scrambled with that group's PN sequence.

If orthogonal spreading codes are used to mitigate interference between control signals at the user terminals (i.e., at the receivers), and if the users feed channel-quality information back to the base station, then it may be possible to independently weight the power in each user's spread signal in response to the channel-quality feedback.

If the base station is equipped with a multiple-antenna array for transmission, it may also be possible to mitigate interference by independently beamforming the control signal to each respective user.

What is claimed is:

1. A method, comprising:
generating control messages that are respectively destined for two or more users;
spreading each control message using a spreading code that is respectively associated with one of the users;
summing the spread control messages, thereby to form a composite control message;
in an OFDM transmitter in which a full range of subcarriers spanning an OFDM symbol is partitioned into a first plurality of subcarriers and a second plurality of subcarriers, mapping the composite control message to the first plurality of subcarriers, thereby to partially define one or more OFDM symbols, wherein the first plurality of subcarriers constitutes a common subchannel for signaling to the users;
in the OFDM transmitter, mapping one or more further messages to the second plurality of subcarriers, thereby to fully define the one or more OFDM symbols; and
transmitting the OFDM symbol or symbols.

2. The method of claim 1, wherein the spreading codes are Walsh codes.

3. The method of claim 1, wherein the spreading codes are PN sequences.

4. The method of claim 1, wherein, the spreading codes are products of Walsh codes with PN sequences.

5. The method of claim 1, further comprising, for at least one user, identifying a subchannel that, has been assigned to said user for making reverse-link transmissions thereon, and wherein the spreading of at least one message to said user is performed using a spreading code associated with said assigned subchannel.

6. A method to be performed at a user terminal, comprising:
receiving an OFDM symbol from a base station on a range of subcarriers that span the OFDM symbol; recovering from the OFDM symbol an OFDM control message received on a common plurality of subcarriers used by the base station for signalling to users, wherein the common plurality constitutes less than the full range of subcarriers that span the OFDM symbol; despreading the control message using a despreading code effective for removing from a composite message such messages as are destined for other users;, and decoding the despread control message.

7. The method of claim 6, wherein the despreading code is equivalent to a Walsh code.

8. The method of claim 6, wherein the despreading code is equivalent to a PN sequence.

9. The method of claim 6, wherein the despreading code is equivalent to a product of a Walsh code with a PN sequence.

10. The method of claim 6, further comprising selecting the despreading code as that code which is associated with a subchannel that has been assigned to said user terminal for making reverse-link transmissions thereon.

* * * * *